Sept. 29, 1936.  W. H. REES  2,055,730
WEIGHING APPARATUS
Filed April 21, 1931  2 Sheets-Sheet 1
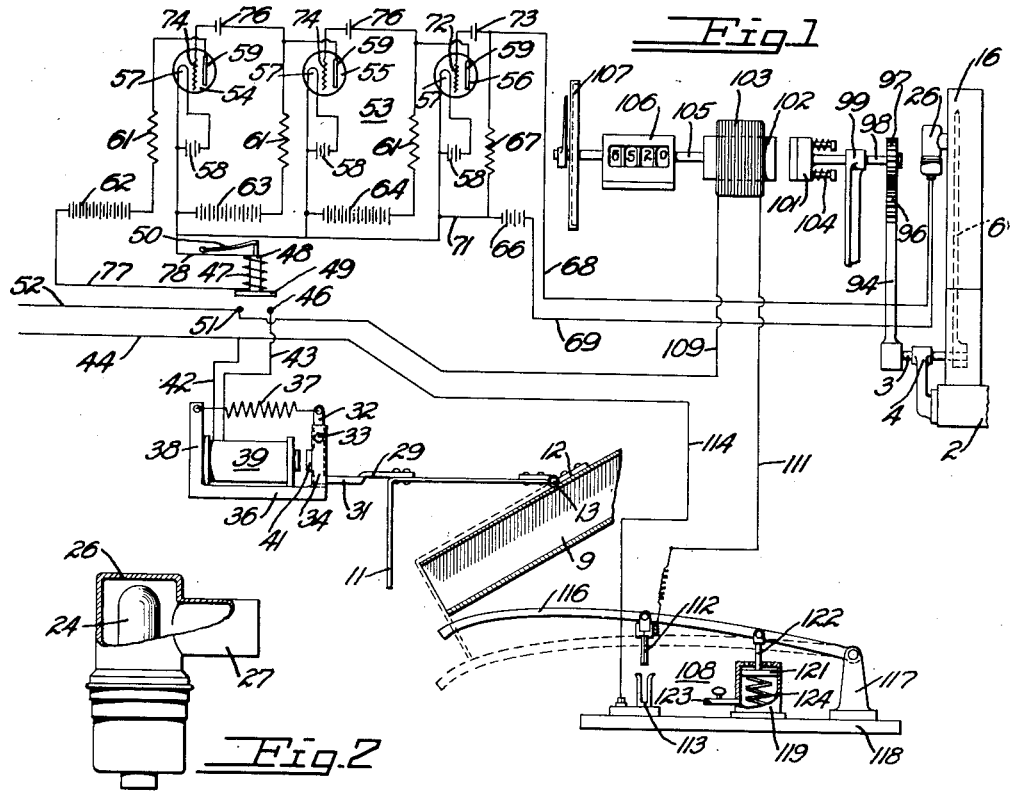
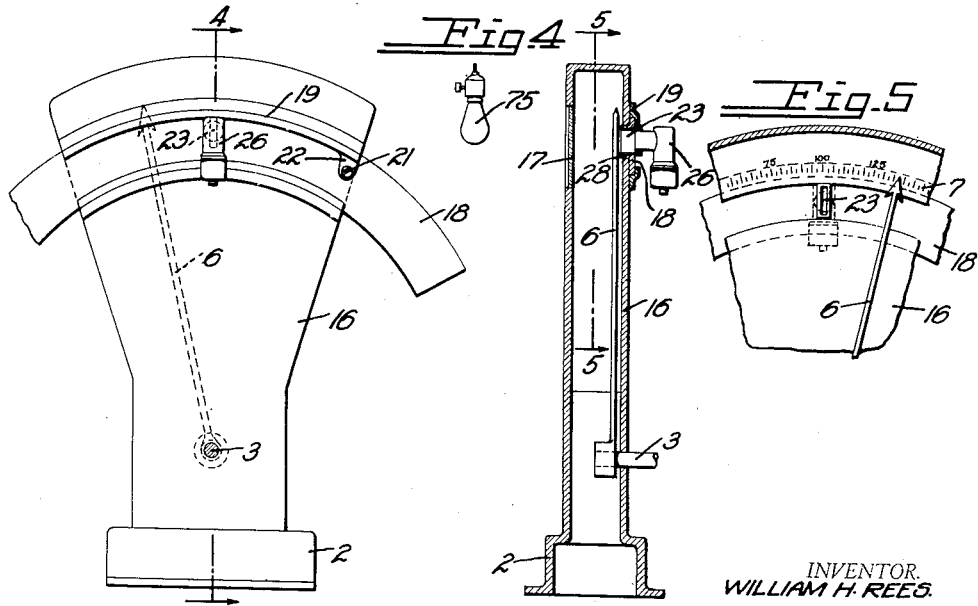
INVENTOR.
WILLIAM H. REES.
BY Charles S. Evans
HIS ATTORNEY

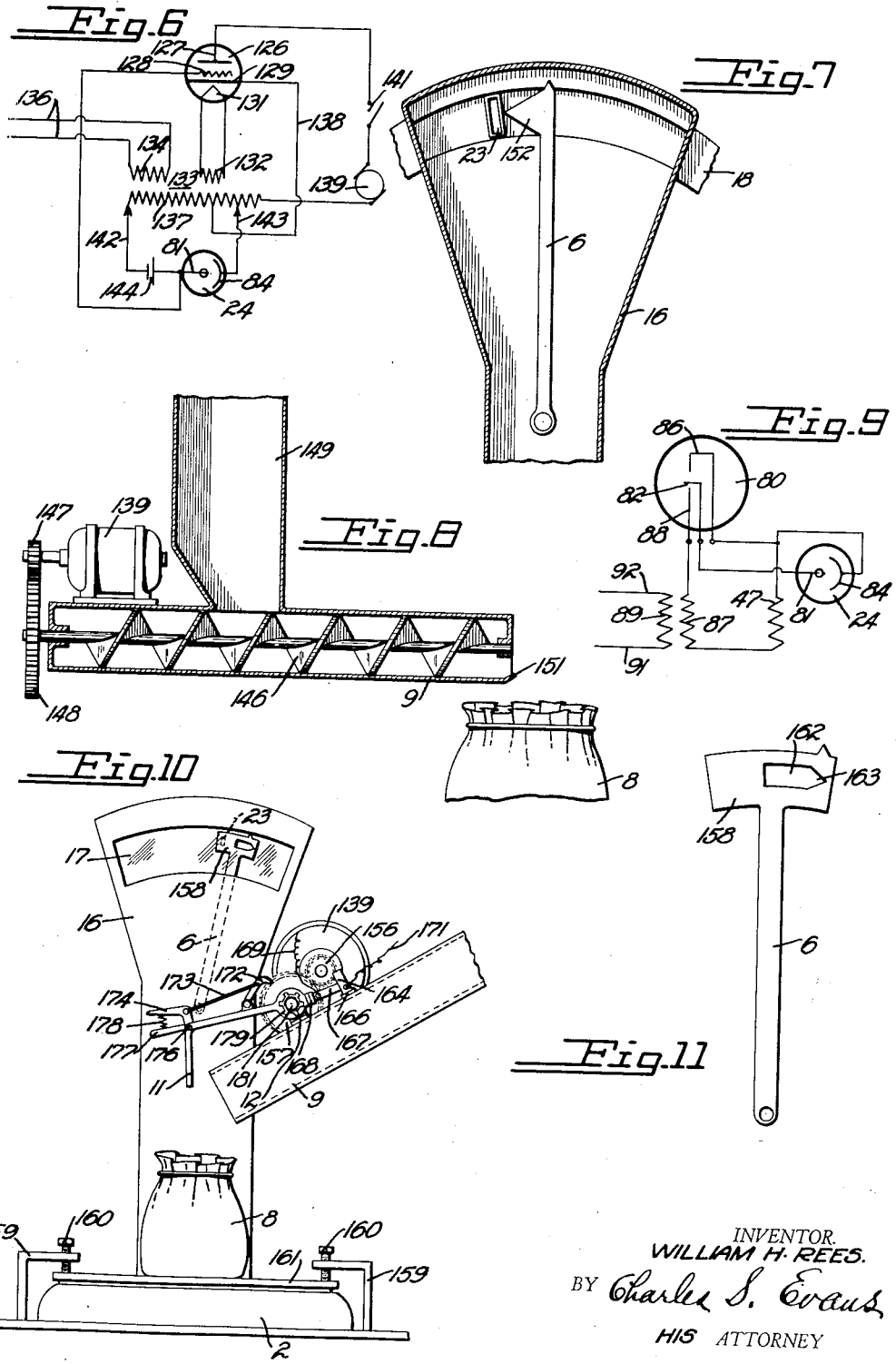

Patented Sept. 29, 1936

2,055,730

UNITED STATES PATENT OFFICE 2,055,730

WEIGHING APPARATUS

William H. Rees, Berkeley, Calif.

Application April 21, 1931, Serial No. 531,716

5 Claims. (Cl. 249—63)

My invention relates to weighing apparatus, and particularly to a device for automatically controlling and recording the operation of scales used to parcel bulk materials.

An object of my invention is the provision of means for automatically shutting off the movement of materials onto a weighing device when a pre-selected weight is reached.

Another object is the provision of means for integrating or totalling the weights of the successive loads thus imposed on a weighing device.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figure 1 is a schematic diagram illustrating the manner in which the electrical and mechanical interconnection within my device may be accomplished.

Figure 2 is a fragmentary detail of the light-sensitive cell housing.

Figure 3 is a rear elevation of a weighing device showing the manner of attachment of the light-sensitive cell.

Figure 4 is a fragmentary sectional elevation of the device of Figure 3, and the plane of section is indicated by the line 4—4 of that figure.

Figure 5 is a fragmentary front elevation of the weighing device viewed as indicated by the line 5—5 of Figure 4.

Figure 6 is a schematic wiring diagram for a variant type of amplifier and gate control.

Figure 7 is a fragmentary sectional view of a scale showing a variant shape for the pointer arm.

Figure 8 is a diagrammatic illustration of a screw type of conveyor and hopper therefor.

Figure 9 is a schematic wiring diagram for an alternative type of amplifier.

Figure 10 is an elevation of a scale and loading chute having a variant type of gate control.

Figure 11 is an enlarged view of the indicating arm shown in Figure 10.

In terms of broad inclusion the apparatus of my invention comprises a weighing device and associated apparatus by means of which bulk materials may be parcelled into pre-selected amounts, and the weights of successive parcels totalled and recorded.

The bulk material preferably flows into a hopper or receptacle on the weighing device proper from a conveyor or gravity spout, and suitable means are provided for automatically controlling the flow of material therefrom in accordance with the movement of an element of the weighing device.

The integration of the total weights of the successive loads is accomplished by causing the retrogressive movement of the weighing device to actuate a suitable integrating and counting mechanism which is normally disengaged from the weighing device, but which is automatically engaged for the retrograde movement by mechanism operable in time with the flow control means.

As thus broadly described the mechanism is similar to that disclosed in my United States Patent No. 1,615,405, dated January 25, 1927. My present invention however differs from the previous one in that the actuating impulse for the gate is obtained from the weighing device through the medium of a light-sensitive or photo-electric cell and a suitable amplifier. The spark gap controlled actuating means of my earlier invention is suitable for the ordinary run of commercial work, but for rapidly operating and sensitive scales, such as those used for parcelling drugs or spices, or for use in an explosive atmosphere, or where the spark discharge would disturb adjacent radio apparatus, I may prefer to use the structure disclosed herein.

In terms of greater detail the weighing apparatus of my present invention comprises a weighing device 2 which may be of any suitable construction such that the load thereon causes a proportional rotation of a shaft 3 journalled in a bearing 4 fixed on the device. The amount of rotation of the shaft 3 is indicated by a pointer or arm 6 fixed thereon and is preferably arranged to traverse a scale 7 which is calibrated to indicate the true weight in the usual manner.

Any desired type of conveyor, hopper, or receptacle may be used to retain the bulk material while it is being weighed and such retaining means or receptacle is accordingly shown only schematically as comprising a sack 8. It is understood, that the receptacle 8 is placed so that the weight of the material therein actuates the weighing device.

In Figures 1, 8 and 10 an arrangement is indicated for filling the receptacle 8 from a spout 9 through which bulk materials may flow from a suitable source of supply. In Figures 1 and 10 the flow from the spout is controlled by a gate 11 pivotally supported thereon by a bracket 12 and pinion or shaft 13. Closure of the gate 11 is automatically initiated by the movement of the indicating arm 6 through the medium of one of two variant mechanisms now to be described. The construction of Figure 1 is suitable for comparatively large parcels of bulk materials where rapidity of operation and extreme accuracy are not essential. The construction of Figures 8 or 10 is preferable when speed of operation and accuracy, particularly for small parcels, is the controlling factor.

In order to accomplish this it is necessary to decrease the flow gradually to avoid the errors introduced by the dribble, that is by varying amounts of materials that may be in the air between the spout and the receptacle at the instant of closing the gate. For smoothly and uniformly flowable materials the quick acting gate of Figure 1 may be adjusted to give amazingly accurate results, say to the order of .2%, but for irregular materials the slow closing gate of Figure 10 is superior since it minimizes the errors due to dribble. In fact for materials that tend to agglomerate, such as raisins, it is still better to associate the control means with a type of positive feeding mechanism such as the screw conveyor of Figure 8.

Referring now to Figures 1 to 5 inclusive the signal or impulse that starts the closing of the gate is initiated by the moving arm 6 which is mounted in a case 16 having a glass observation pane 17 set into one side, and an arcuate plate 18 slidably mounted on the other side in the arcuate guides 19. A set screw 21 threaded into a bracket 22 on the case and engaging the plate 18 provides means for holding that member in adjusted position. A light tunnel 23, preferably rectangular in shape, is provided on the plate 18 of a shape and in a position where it is fairly closely covered by the arm 6 at one point in its swing so that light is thus shut off from a light-sensitive or photo-electric cell 24 which is mounted in an opaque case 26 supported by a nipple 27 inserted in a socket 28 fixed on plate 18 in the rear of the tunnel 23. By adjusting the position of plate 18 the photo-cell can be placed at any desired point in the swing of arm 6 corresponding to a weight on the weighing device at which the gate 11 is to be closed, and the electrical effect produced in the photo-cell by shutting off the light can be utilized to initiate the closing of the gate through the medium of apparatus now to be described.

The gate 11 is held in its open or raised position by a projecting finger 29 fixed thereon and engaging a sear 31 formed as an integral portion of a lever 32 pivotally mounted on a pin 33 fixed in the standards 34 of a solenoid bracket 36. The sear 31 is normally held in its extended position by a spring 37 fastened between a rear standard 38 of bracket 36 and the upper end of lever 32. A solenoid 39 is fixed on standard 38 in a position to attract an armature 41 fixed on the lower end of lever 32. Thus when the solenoid is energized it attracts armature 41 disengaging the sear 31 from finger 29 which permits the gate 11 to drop and shut off the flow of material from the spout, or chute 9. Solenoid 39 is energized through the conducting leads 42 and 43 which are connected respectively to a lead 44 of a suitable source of electric current, and a terminal 46 of a solenoid controlled relay. This relay comprises a coil 47 having a magnetic plunger 48 slidably mounted therein and actuating a contactor 49 adapted to connect terminal 46 to a terminal 51 which is in contact with the other lead 52 of the source of electric current. The relay is arranged so that contactor 49 is disengaged from the terminals when the coil 47 is energized by a certain amount, and so that the plunger will fall by gravity to close the contactor across the terminals when the current in coil 47 falls below a certain amount. Instead of relying upon the force of gravity to actuate the plunger a spring, dashpot or other suitable means could be employed to press the contactor toward the terminals, as indicated schematically by the cantilever spring 50 mounted to press downward on plunger 48.

A photo-electric cell alone, as so far devised, does not supply sufficient energy to operate such a mechanical relay directly, and so, at present, it is necessary to provide a suitable current amplifier, identified by the general reference numeral 53, between the photo-electric cell and the relay coil 47. For the purpose of illustration this amplifier is shown as comprising three triodes 54, 55 and 56 having the usual filaments 57 energized by batteries 58; plates or anodes 59 energized through resistors 61 by the batteries 62, 63, and 64; and control grids connected in a manner now to be described.

The photo-electric cell is energized by a battery 66 through a resistor 67 and the conducting leads 68 and 69. One terminal of resistor 67 is connected to the cathode of triode 56 through a conductor 71, and the other terminal is connected to the control grid 72 of triode 56 through a blocking condenser 73. With ordinary tubes there is sufficient inter-electrode leakage to prevent the grid from accumulating a negative charge and blocking the tube. If difficulty is experienced in this regard it may be necessary to provide an external leak for the grid in the well known manner.

Variations of current in the photo-cell will then cause variations of potential across the resistor 67 and thus control the output from anode 59 of triode 56 in the usual way.

There is ordinarily sufficient light available to operate the photo-cell, but if there is not, a source of light such as the electric bulb 75 may be placed in front of the light tunnel as indicated in Figure 4.

The control grids 74 of successive tubes are similarly controlled through the blocking condensers 76, and the signal is amplified sufficiently to operate the relay. The coil 47 is connected by the conductors 77 and 78 into the output circuit of triode 54 and completes the circuit whereby the closing of the light tunnel 23 by the arm 6 decreases the current in coil 47 and permits the contactor 49 to fall onto the terminals 46 and 51.

By using a more sensitive relay a circuit of the type shown in Figure 9 may be employed, in which a grid glow tube 80 is used in place of the amplifier 53. Here the emitting element 81 of the photo-cell 24 is connected to the control grid 82 of the grid glow tube 80. The anodes 84 and 86 of the cell and tube are connected together and to a terminal of the coil 47 of the relay. The other terminal of the coil is connected to a terminal of the output coil 87 of a suitable supply transformer which in turn is connected to the cathode 88 of the grid glow tube. Power is supplied to the primary coil 89 of the transformer from a suitable source through the leads 91 and 92.

This circuit operates in a manner analogous to that already described as the passage of current in the photo-cell may be caused to initiate or stop the flow of current in the grid glow tube and thus control the gate 11 through the medium of the solenoid actuated trip and relay previously described and shown in Figure 1.

It greatly facilitates the checking and accountancy work pertaining to parcelling bulk materials if the weighing scales can also perform the function of integrating or totalling the amount of material passing over them. This highly desirable result is accomplished by means of a mechanism now to be described.

Actuating force for the counting mechanism is derived from the scales through the medium of an arm 94 fixed on shaft 3 of the scales to support and actuate a spur gear segment 96 held on its outer end. This scale actuated gear 96 is meshed with a gear 97 fixed on a shaft 98 journaled in bearing 99. On the end of shaft 98 is slidably mounted the armature 101 of a magnetic clutch disposed to engage the electro-magnet 102 when the surrounding coil 103 is energized, but normally held out of engagement by the springs 104. The magnet 102 is fixed on a shaft 105 which operates a suitable counting device 106 and partial revolution indicating dial 107.

If this counting mechanism were connected to the scales during the forward movement thereof, the resulting friction would introduce irregular errors for which it would be difficult to compensate. Accordingly the magnetic coupling 101—102 is open during the accessive movement of the scales and does not close until the scales have come to rest after weighing a parcel of material, then, when the parcel is removed, the counting mechanism is operated by the retrogressive movement of the scale.

Such operation of the magnetic clutch or coupling 101—102 is preferably accomplished automatically in time with the operation of the gate through suitable mechanism such as the switch identified by the general reference numeral 108. One terminal of coil 103 on the clutch is connected through a lead 109 to one lead 52 of the source of power. The other terminal of coil 103 is connected to the other lead 44 of the source of power through a path comprising a conductor 111, a movable switch contactor 112, a fixed contactor 113 and a conductor 114.

The engagement of contactors 112 and 113 is effected by the gate 11 through the medium of an arm 116 pivotally mounted in a bracket 117 fixed on a base 118 of the switch 108. Contact 112 is fixed on arm 116 in a position to engage contact 113 fixed on base 118, when arm 116 is pressed downward by gate 11. It is to be noted that the various parts are so placed and proportioned that the switch does not begin to function until the flow from chute or spout 9 is completely shut off by gate 11, and that a further delay is provided so that there is ample time for all of the dribble to fall into the receptacle and the scales to come to rest before the integrating device is connected.

This delay is provided by a retarding device comprising a cylinder 119 fixed on base 118 and having a piston 121 slidably mounted therein. This piston is connected to arm 116 by a suitable link 122 and thus resists the downward movement of the arm by an amount dependent upon the compression beneath the piston.

In order that the compression in the cylinder and hence the rapidity of motion of arm 116 may be regulated, a petcock 123 is screwed into the cylinder wall adjacent the bottom thereof to provide means for regulating the speed of the air escape from the cylinder. Downward movement of the piston is further retarded by a helical spring 124 inserted in the cylinder beneath the piston to provide the retractive force for arm 116 and the contactor.

To use this apparatus an operator places a receptacle 8 on the scales and raises the gate 11 until sear 31 catches finger 29. Material then flows into the receptacle from the spout or chute 9 until the pointer 6 covers light tunnel 23. This decreases the current in coil 47 and permits contactor 49 to close the circuit through solenoid 39 and release the sear. Gate 11 immediately drops across the outlet of the chute and stops the flow. It strikes arm 116, however, before it has reached the limit of its travel and presses that member down at a rate determined by the setting of petcock 123. This is so adjusted that as soon as the scales have come to rest at the true weight contact is made between the contactors 112 and 113 and the resultant current in coil 103 pulls the armature 101 against the electro-magnet 102. Then when the filled receptacle 8 is removed from the scales the resulting retrogressive movement thereof operates the counting or totalling mechanism to record the true weight of that particular parcel. When gate 11 is again lifted to fill the next parcel spring 124 separates contactors 112 and 113 which releases clutch 101—102 so that the counting or totalling mechanism does not interfere with the operation of the scales during the weighing operation.

A variant amplifying circuit for the photoelectric signal is shown in Figure 6. This arrangement is particularly useful in conjunction with the slow closing gate of Figure 10, or the screw conveyor of Figure 8. The operation of this circuit depends upon the performance of a thyatron tube 126, which has an anode 127, a control screen 128, a cathode 129 within the screen, and a heating element 131 for energizing the cathode. The heating element 131 is supplied with electric current from a secondary winding 132 of a transformer 133 having a primary coil 134 excited from a suitable source of alternating current 136.

A high tension secondary coil 137 has its midpoint connected to the cathode by a conductor 138, an outer terminal connected to the anode 127 through a motor 139 and a switch 141, and two opposed and variable outer taps 142 and 143 connected to the control grid 128 through a condenser 144 and a photo-electric cell 24 respectively.

Unlike many types of tubes relying upon an ionic discharge for their operation, the discharge of a thyatron tube is not extinguished by the control element charge. All the control element does is to fix the time of beginning of the flow of current from the anode within each positive half cycle. Once established such a flow maintains itself until the anode potential is no longer positive.

By referring to Figure 6 it can be seen that the photo-cell 24 controls the escape of electrons from the control grid 128, and it is also apparent that the phase and amount of potential across the photo-cell is determined by the setting of the variable taps 142 and 143, and the capacity of condenser 144. These values may be selected so that for a given variation of light intensity on the photo-cell a given variation of output from the anode may be obtained, and such a variation of output may be used to vary the speed of a motor or to start and stop it, or to control a relay, if desired.

In Figure 8 motor 139 is shown driving a screw conveyor 146 through suitable gears 147 and 148. Bulk material flows into the conveyor from a hopper 149, and flows from the conveyor, preferably over a restraining lip 151, into the receptacle 8 on the scales. Having placed an empty receptacle on the scales beneath the lip 151 the operator closes switch 141 and motor 139 starts the conveyor, which begins to discharge material into the receptacle. The weight of this material on the scales swings the arm 6 as shown in Figure 7, to the left until a pointed tab 152 on arm 6 begins to shut light from the tunnel 23. This decrease of light effects the photo-cell and thyatron tube so that the motor and hence conveyor 146 slow down. As the tab 152 shuts off more and more light the motor slows down accordingly until there is but a very slight dribble of material over lip 151 and the parcel is very slowly brought to precisely the desired weight.

It is thus possible to operate the conveyor at its maximum speed during the major portion of the loading and then slow it down for a few seconds only, while the final adjustment is being made. The errors in weight, if any, of the individual parcels formed in this manner are so small that commercial scales do not detect them. However, if a check is desired a counting or integrating apparatus similar to that of Figure 1 may also be used in conjunction with this embodiment.

The slow closing gate construction is illustrated in Figure 10, in which the motor 139 closes the gate 11 through the medium of spur gears 156 and 157. Motor 139 may be a torque motor controlled as in Figures 6 and 7 to hold the gate 11 open against the action of gravity, or a spring, and then let it close slowly when the tab 152 shuts off the light. I prefer however to have the motor apply its force to close the gate positively as shown.

In order to accomplish this a special shape is given the outer end of arm 6 as shown in Figure 11. Here the tab portion 158 normally closes the light tunnel 23, and a suitable stop is provided for the scales to prevent the arm 6 from returning toward zero and uncovering the tunnel when the load is removed from the scales. As an example of such a stop I have shown, in Figure 10, the brackets 159 fixed on the scale 2 and supporting the adjustable screws 160 which bear against the load platform 161 of the scales. By adjusting these set screws the tab 158 may be placed over light tunnel 23 in any position on the scale.

When the load in receptacle 8 on the scale exceeds a pre-selected amount the arm 6 begins to move and brings an aperture 162 in tab 158 over the light tunnel 23. This starts motor 139 and the gate 11 is closed, fairly rapidly at first as the wide portion of aperture 162 is over tunnel 23, and then more slowly as the cut-off point is reached and the converging portion 163 of the aperture begins to shut off light from tunnel 23. In this arrangement switch 141 is caused to open the motor circuit when the gate is completely closed and is shown in Figure 10 as comprising a terminal 164 supported by a suitable insulating block 166 on chute 9, and a terminal 167 supported by an insulating block 168 on a rearwardly projecting portion of gate 11 and slidably engaging terminal 164. Terminal 167 is connected to motor 139 through a lead 169, and terminal 164 is connected to anode 127 of the thyatron through a lead 171.

Thus, when gate 11 has closed the chute, terminal 167 slips from terminal 164 which opens the motor circuit and stops the gate. If it is desired to use an integrating and counting mechanism with this type of control it is necessary to extend the tab 158 so that arm 6 may return to zero each time the load is removed from the scales.

Gate 11 is locked for rotation with gear 157 by a pawl 172 pivotally mounted on the gate. This pawl may be manually operated through the medium of a link 173 interconnecting it with a lever 174 pivotally supported on a pin 176 adjacent the outer end of the gate. Lever 174 is preferably bent around so that it is juxtaposed a handgrip 177 fixed on the gate to form a convenient means for operating the pawl.

A spring 178 interposed between the hand-grip and the lever holds the pawl engaged with gear 157, and a friction washer 179 held on the end of pinion 13 by a nut 181 presses against bracket 12 to hold the gear and hence the gate in position when the motor is not in operation.

I claim:

1. An apparatus for parcelling bulk materials comprising, a weighing device having a movable element, a mechanical conveyor for discharging material onto the device, electrically actuated driving means for the conveyor, a source of electric energy, means controlling the flow of electricity to said electrically actuated driving means, and a light sensitive cell associated with said movable element and said electricity flow control means to variably actuate said control means for gradually stopping the conveyor as a pre-selected weight of parcel is reached.

2. An apparatus for parcelling bulk materials comprising, a weighing device having a movable element, a chute for directing material onto the weighing device, a gate for closing the chute, electrically actuated closing means for the gate, a source of electric energy, means controlling the flow of electricity to said electrically actuated means, and a light sensitive cell associated with said movable element and said electricity flow control means to variably actuate said control means for gradually closing the gate as a preselected weight of parcel is reached.

3. In combination, a weighing device having a movable element, means for feeding material to be weighed onto said device, means for regulating the flow of material to the weighing device, and light sensitive means associated with the movable element of the weighing device for actuating the flow regulating means to gradually cut off the flow of material to the weighing device as a predetermined weight is being reached.

4. In combination, a weighing device having a movable element, a duct for feeding material to be weighed onto said device, a gate on the duct for regulating the flow of material through the duct, gate actuating means, and light sensitive means associated with the movable element of the weighing device and controlling said gate actuating means for gradually closing the gate as a predetermined weight is being reached.

5. In combination, a weighing device having a movable element, a conveyor for feeding material to be weighed onto said device, means for moving the conveyor, and light sensitive means associated with the movable element of the weighing device for controlling the conveyor moving means to gradually slow down the conveyor movement as a predetermined weight is being reached.

WILLIAM H. REES.